US008050927B2

(12) United States Patent
Yoo et al.

(10) Patent No.: US 8,050,927 B2
(45) Date of Patent: Nov. 1, 2011

(54) APPARATUS AND METHOD FOR OUTPUTTING VOICE RELATING TO THE PREFERENCES OF A USER

(75) Inventors: Byung-in Yoo, Seoul (KR); Yeun-bae Kim, Seongnam-si (KR); Seong-woon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1022 days.

(21) Appl. No.: 11/980,525

(22) Filed: Oct. 31, 2007

(65) Prior Publication Data

US 2008/0162139 A1 Jul. 3, 2008

(30) Foreign Application Priority Data

Nov. 30, 2006 (KR) ........................ 10-2006-0119988

(51) Int. Cl.
*G10L 13/00* (2006.01)
*G10L 21/00* (2006.01)
*H04N 7/173* (2006.01)
*G10L 13/08* (2006.01)

(52) U.S. Cl. .................. 704/260; 348/E7.073; 704/270; 704/275; 725/88; 725/102

(58) Field of Classification Search ................... 704/260
See application file for complete search history.

(56) References Cited

U.S. PATENT DOCUMENTS 6,006,241 A * 12/1999 Purnaveja et al. ............ 715/205
7,711,569 B2 * 5/2010 Takeuchi et al. .............. 704/275
2002/0161835 A1 * 10/2002 Ball et al. ...................... 709/203
2004/0125133 A1 * 7/2004 Pea et al. ...................... 345/751
2005/0033657 A1 * 2/2005 Herrington et al. ............. 705/26
2006/0143665 A1 * 6/2006 Meek et al. ...................... 725/88
2007/0094247 A1 * 4/2007 Chowdhury et al. ............. 707/4
2007/0260460 A1 * 11/2007 Hyatt ............................ 704/260

FOREIGN PATENT DOCUMENTS

JP 2003-131700 * 5/2003
KR 10-2001-0000840 * 1/2001
KR 10-2001-0008385 * 2/2001
KR 10-2003-0069472 8/2003

OTHER PUBLICATIONS

Korean Office Action issued Jan. 25, 2008 in corresponding Korean Patent Application No. 10-2006-0119988, with English Translation.

* cited by examiner

*Primary Examiner* — Justin Rider
(74) *Attorney, Agent, or Firm* — Staas & Halsey LLP

(57) ABSTRACT

Provided is an apparatus and method for output voice, which receives an information item suitable to a user's taste among information items existing on a network such as the Internet in a text format, converts the information item into voice, and then outputs the voice. The apparatus to output voice includes an information search unit searching at least one first information item corresponding to a preset information class among information items existing on a network, an information processing unit extracting a core information item from the first information items in such a manner as to correspond with a preset reproducing time period, a voice generating unit converting the core information into voice, and an output unit outputting the converted voice.

29 Claims, 11 Drawing Sheets

FIG. 6B

650

651 652 653

| CORE WORD | CORE WORD APPEARING FREQUENCY | THE NUMBER OF PARAGRAPHS USING CORE WORD |
|---|---|---|
| NETWORK | 4 | 3 (FIRST PARAGRAPH, SECOND PARAGRAPH, THIRD PARAGRAPH) |
| TRAFFIC | 3 | 2 (FIRST PARAGRAPH, SECOND PARAGRAPH) |
| NAVIGATION | 2 | 2 (FIRST PARAGRAPH, THIRD PARAGRAPH) |

APPARATUS AND METHOD FOR OUTPUTTING VOICE RELATING TO THE PREFERENCES OF A USER

CROSS-REFERENCE TO RELATED APPLICATIONS

This application claims priority from Korean Patent Application No. 10-2006-0119988 filed on Nov. 30, 2006 in the Korean Intellectual Property Office, the disclosure of which is incorporated herein by reference in its entirety.

BACKGROUND OF THE INVENTION

1. Field of the Invention

The present invention relates generally to an apparatus and method for outputting voice. More particularly, the present invention relates to an apparatus and method for outputting voice, which receives an information item suitable to the user's taste among information items existing on a network, such as the Internet, in a text format, converts the information item into voice, and then outputs the voice.

2. Description of the Related Art

As the ARPANET, which was constructed in 1966 so as to connect four universities in the U.S.A. with each other with the aid of the U.S. Department of Defense became known as the Internet in 1990, it has become possible for users to share one or more information items with each other through the Internet. However, information items existing on the Internet are too vast for users to easily search one or more desired information items. As a result, web-based search sites and portal sites have appeared.

However, since such search sites or portal sites indiscriminately provide searched contents, all users receive the same kind of contents. That is, the users receive the same kind of contents regardless of their tastes.

In the past, portable computer apparatuses have included PDAs (Personal Digital Assistants) and laptops. However, as the functions of portable phones have been diversified, it has also become possible for a portable phone to serve as a portable computer apparatus. In addition, portable apparatuses, which provide services such as games, navigation, digital multimedia broadcasting or multimedia contents' reproduction, have appeared, where such apparatuses not only provide their own functions but also provide information items existing on networks by using wireless communication.

Despite the increase in the supply of portable apparatuses, all users indiscriminately receive certain information items as described above. As a result, each user receives information items that are not suitable to the user's own taste, but suitable to popular tastes.

In addition, portable devices typically have a display window that is not very large in order to emphasize the portability of the device. Thus, a user may feel that receiving an information item transmitted through a network in a text format displayed on the display window is inconvenient.

Therefore, an information item suitable to a user's taste among a vast number of information items existing on a network is needed to be easily and conveniently transmitted to the user.

SUMMARY

Accordingly, the present invention has been made to solve the above-mentioned problems occurring in the prior art, and an object of the present invention is to provide an apparatus and method of receiving one or more information items suitable to a user's taste among vast information items existing on a network in a text format.

Another object is to provide an apparatus and method of converting a received text into voice, and outputting the voice.

Another object is to provide an apparatus and method of converting a received text into voice in consideration of a lapse of time of reproducing the voice, so that a corresponding information item can be outputted in a preset time period.

Additional aspects and/or advantages of the invention will be set forth in part in the description which follows and, in part, will be apparent from the description, or may be learned by practice of the invention.

The foregoing and/or other aspects of the present invention are achieved by providing an apparatus to output voice, including: an information search unit searching at least one first information item corresponding to a preset information class among information items existing on a network; an information processing unit extracting a core information item from the first information item such that an estimated voice reproducing time period for the first information item corresponds to a preset reproducing time, period; a voice generating unit converting the core information into voice; and an output unit outputting the converted voice.

The foregoing and/or other aspects of the present invention are achieved by providing a method of outputting voice, including: searching at least one first information item corresponding to a preset information category among information items existing on a network; extracting a core information item from the first information item such that an estimated voice reproducing time period for the first information item corresponds to a preset reproducing time period; converting the core information item into voice; and outputting the converted voice.

Particulars of other embodiments are incorporated in the following description and attached drawings.

BRIEF DESCRIPTION OF THE DRAWINGS

The above and other aspects, features and advantages of the present invention will be more apparent from the following detailed description taken in conjunction with the accompanying drawings, in which:

FIG. 6B is a table indicating the frequency of appearance of core words included in a first information item of FIG. 6A;

DETAILED DESCRIPTION OF THE PREFERRED EMBODIMENTS

Figure 1:
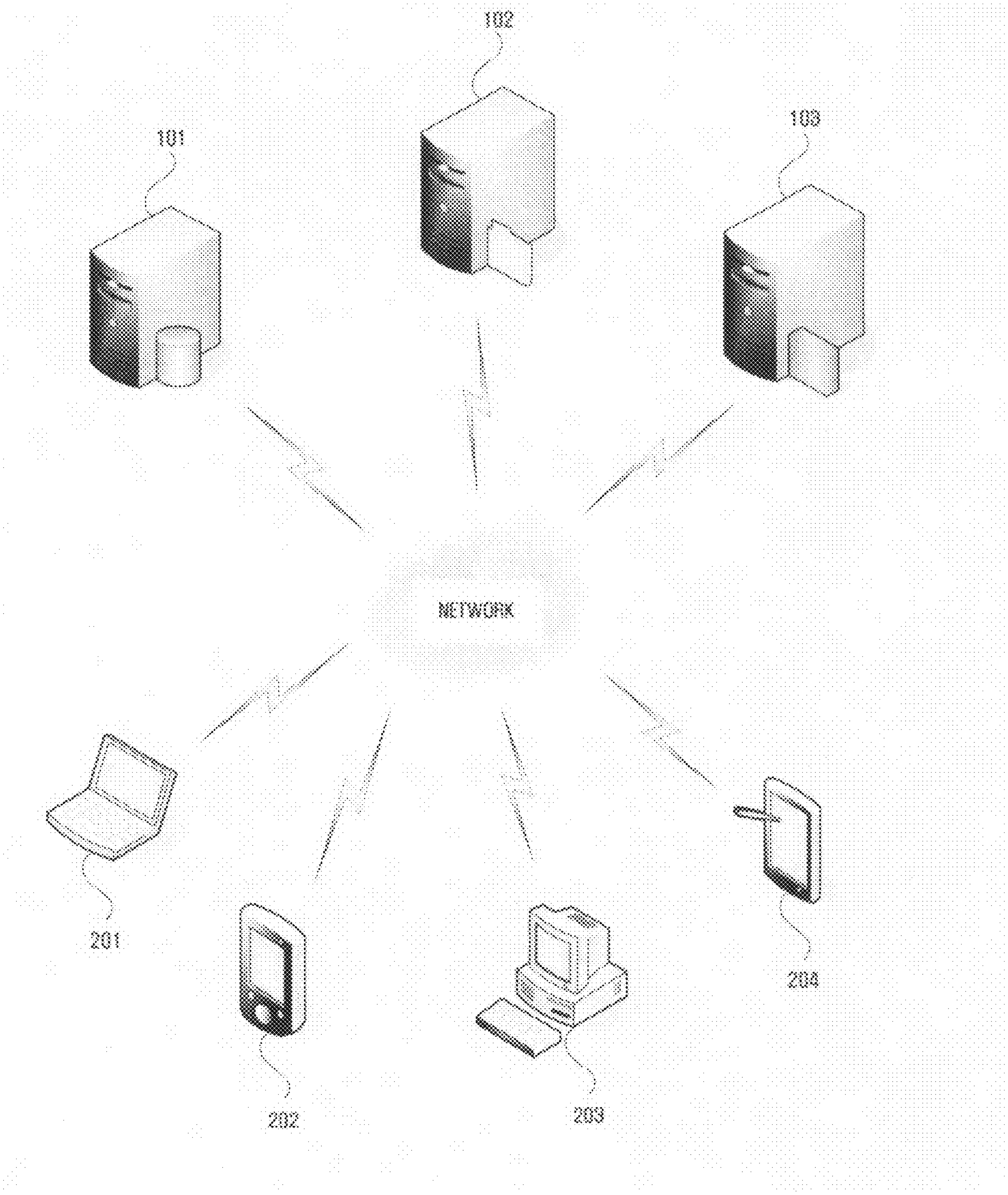
FIG. 1 is a conceptual view illustrating a voice output system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Advantages and features of the present invention, and ways to achieve them will be apparent from embodiments of the present invention as will be described below together with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

Hereinafter, preferred embodiments of the present invention will be described with reference to the accompanying drawings.

FIG. 1 is a conceptual view illustrating a voice output system according to an embodiment of the present invention, in which the voice output system includes one or more information providing servers 101, 102 and 103 which provide one or more information items existing on a network, and a voice outputting apparatus 201, 202, 203 or 204 which outputs an information received from one of the information providing servers 101, 102 or 103 as a voice.

The voice outputting apparatus 201, 202, 203 or 204 receives information from one of the information providing server 101, 102 or 103, where the information providing servers 101, 102 and 103 include not only servers providing portal services or search systems, but also include various URLs (Uniform Resource Locators) existing in a lower regime as compared to the servers.

In addition, all servers, which are assigned to individuals so as to allow access from all users on a network, may be included in the information providing servers 101, 102 and 103.

The voice outputting apparatus 201, 202, 203 or 204 serves to receive an information item from the information providing server 101, 102 or 103, thereby converting the information item into a voice, and then to output the voice.

As shown in FIG. 1, computer apparatuses, such as a laptop 201, a PDA (Personal Digital Assistant) 202, a desktop 203, and a tablet computer 204, may be included in the voice outputting apparatuses 201, 202, 203 and 204. In addition, portable apparatuses, such as a portable phone, a PMP (Personal Multimedia Player), and a navigation tool, may also be included as voice outputting apparatuses 201, 202, 203 and 204. Moreover, home appliances, such as a homepad and a wallpad, may be included as the voice outputting apparatuses 201, 202, 203 and 204.

The information categories searched by the voice outputting apparatus 201, 202, 203 or 204 may include news, shopping, e-mail and local broadcasting, where the voice outputting apparatus 201, 202, 203 or 204 can only search the information items included in the information categories designated by the user. That is, if the user inputs the information categories to the voice outputting apparatus 201, 202, 203 or 204 so that the voice outputting apparatus 201, 202, 203 or 204 only searches information items related to news and sports, the voice outputting apparatus 201, 202, 203, or 204 searches at least one of the information providing servers 101, 102 and 103 to find only the information items related to recent news and sports. In addition, if the user inputs fixed property and stock as the information categories, the voice outputting apparatus 201, 202, 203 or 204 may only search the information items corresponding to the inputted categories among recent news, or access one or more specific specialized sites so as to search recent information.

Either wireless or wired communication means may be employed as a communication means between the information providing servers 101, 102, and 103 and the voice outputting apparatus 201, 202, 203 or 204. Meanwhile, the information items provided from the information providing servers 101, 102 and 103 includes one or more information items configured in a text format, an HTML (HyperText Markup Language) format, an XML (eXtensible Markup Language) format, or an RSS (RDF Site Summary) format, wherein because the capacity of the information items provided in these formats is not so high as compared to multimedia contents, such information items can be readily transmitted/received even through a wireless communication means.

In outputting voice corresponding to one or more searched information items, the voice outputting apparatus 201, 202, 203 or 204 can adjust the size of the searched information items with reference to a preset reproducing time period, wherein the reproduction can be implemented by extracting a core information item from the searched information items.

The voice outputted by the voice outputting apparatus 201, 202, 203 or 204 may include an advertisement beyond the voice related to the searched information items. That is, the voice outputting apparatus 201, 202, 203 or 204 may receive a text related to an advertisement or the like while searching one or more information items, wherein the received advertisement-related text is converted into voice and outputted by the voice outputting apparatuses.

Here, an advertisement-related text may be provided either from the information providing servers 101, 102 and 103 or from a separate server only providing advertisement-related texts (hereinafter, to be referred to as "advertisement providing server"). At this time, the voice outputting apparatus 201, 202, 203 or 204 may be stored with a URL of an advertisement providing server so as to receive advertisement-related texts from the advertisement providing server.

Figure 2:
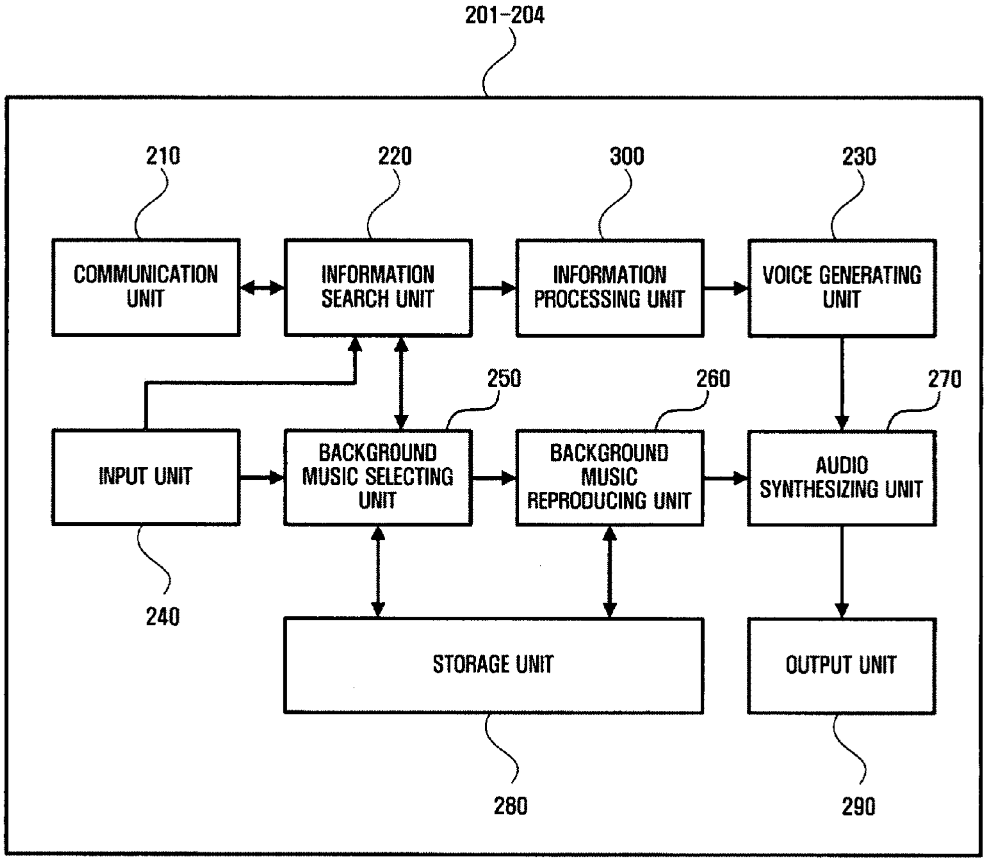
FIG. 2 is a block diagram illustrating a voice outputting apparatus according to an embodiment of the present invention.

FIG. 2 is a block diagram illustrating a voice outputting apparatus 201-204 according to an embodiment of the present invention, where the voice outputting apparatus 201-204 includes a communication unit 210, an information search unit 220, an information processing unit 300, a voice generating unit 230, an input unit 240, a background music selecting unit 250, a background music reproducing unit 260, an audio synthesizing unit 270, a storage unit 280, and an output unit 290.

A voice reproducing time period is inputted through the input unit 240. The voice reproducing time period is a duration of reproducing voice outputted through the output unit 290, and the reproducing time period can be inputted by a user. For example, assuming that the user inputs twenty (20) minutes as the voice reproducing time period, the information processing unit 300, which will be described later, adjusts the collected information items in an amount for twenty minutes, and voice related to the adjusted information items is outputted through the output unit 290.

In addition, the voice reproducing time period may be set as a specific time interval. For example, a start time point and a termination time point of outputting voice, e.g. from 1:20 p.m. to 2:10 p.m., can be inputted through the input unit 240.

Furthermore, the voice reproducing time period may be either duration or a time interval for reproducing voice converted with reference to one or more positional information items inputted through the input unit 240. For example, if the user inputs a positional information item for a starting position, point "A," and a positional information item for a destination, point "B." an estimated time period required for moving from the "A" point to the "B" point may be set as the voice reproducing time period.

It is also possible to input information categories through the input unit 240. For example, it is possible to input information, such as news, sports, entertainment, shopping, etc. For this purpose, the input unit 240 may be provided with one or more input means, such as buttons, wheels, a touch pad or a touch screen, a voice input means receiving a user's voice, etc.

It is also possible to input one or more key words through the input unit 240. For example, key words, such as network, navigation, etc., may be inputted. As such, the information search unit 220 can implement a search according to the inputted key words rather than the categories of information. If the categories of information and the key words are both inputted, the information search can be implemented on the basis of both the categories of information and the keywords.

The communication unit 210 serves to communicate with an information providing server 101, 102, or 103 to receive one or more information items. In communication between the communication unit 210 and the information providing server 101, 102, or 103, either wired communication, such as Ethernet, USB, IEEE 1394, serial communication, and parallel communication, or wireless communication, such as IR (Infra-Red) communication, Bluetooth, home RF, and wireless LAN (Local Area Network) can be employed.

The information search unit 220 serves to search information items existing on a network. Here, the information items existing on a network include information items provided by an information providing server. For this reason, the information search unit 220 may use the URL of the information providing server 101, 102, or 103. The URL of the information providing server may be stored in the storage unit 280 or be directly inputted by the user.

In searching information items, the information search unit 220 may search an information item corresponding to a preset category (hereinafter, to be referred to as "a first information item"). Here, the "preset category" is an information category set by the user, wherein the user can input one or more categories.

The information search unit 220 is only capable of searching an information item prepared in a text format, an HTML format, an XML format or an RSS format, except an information item of high capacity, such as multimedia contents, among the information items stored in the information providing servers. As a result, the communication unit 210 receives the first information item which uses a narrow bandwidth.

The information processing unit 300 extracts a core information item from the first information item such that an estimated voice reproducing time period for the first information item corresponds to a preset voice reproducing time period. For example, if the preset voice reproducing time period is twenty (20) minutes, and if the estimated voice reproducing time period after the first information item is converted into voice is thirty (30) minutes, the information processing unit 300 extracts a core information item from the first information item, so that the duration of outputting the converted voice can be 20 minutes. The detailed description as to the extraction of a core information item will be described later with reference to FIGS. 6A and 6B.

Figure 3:
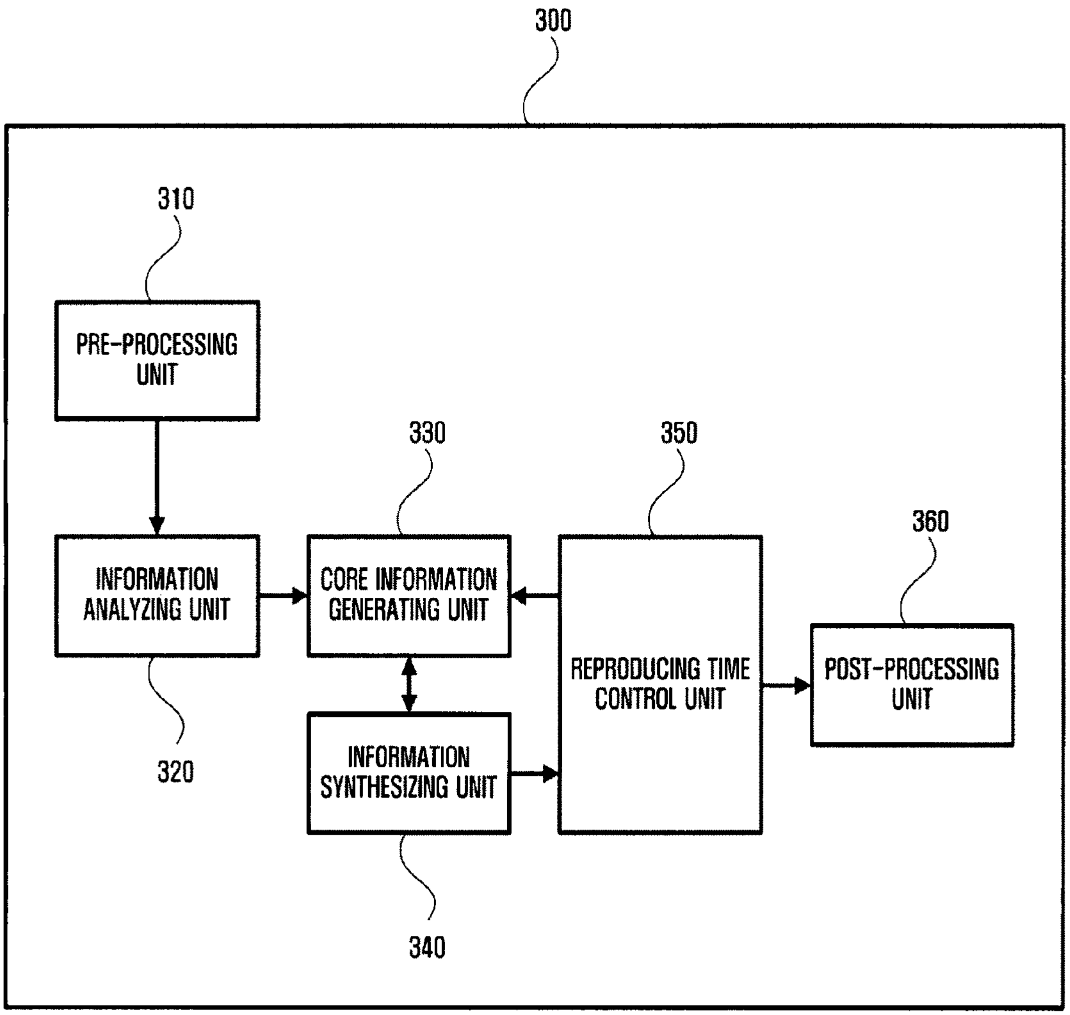
FIG. 3 is a block diagram illustrating in detail an information processing unit of FIG. 2.

The detailed construction for the information processing unit 300 is shown in FIG. 3, where the detailed construction includes a pre-processing unit 310, an information analyzing unit 320, a core information generating unit 330, an information synthesizing unit 340, a reproducing time control unit 350, and a post-processing unit 360.

The pre-processing unit 310 extracts a text information item from the first information item. For example, when the first information item is provided in an HTML or XML file, the first information item may include a tag and an additional information item beyond a text information unit. The pre-processing unit 310 extracts only the text information, from which the tag and the additional information item are removed.

The information analyzing unit 320 analyzes the inputted first information item in terms of word units and extracts one or more core words included in the first information item. Here, the core words are words appearing more frequently than other words among the words included in the first information item. A plurality of core words can be extracted. In such a case, the core words are arranged according to the appearance frequency thereof, and then transmitted to the core information generating unit 330.

In addition, the information analyzing unit 320 may extract such core words by reference to one or more key words inputted by the user. That is, the information analyzing unit 320 determines core words corresponding to one or more key words among the words included in the first information item, arranges the core words according to the appearance frequency, and then extracts the core words. At this time, the information analyzing unit 320 may prepare a table 650 as shown in FIG. 6B.

Figure 6A:
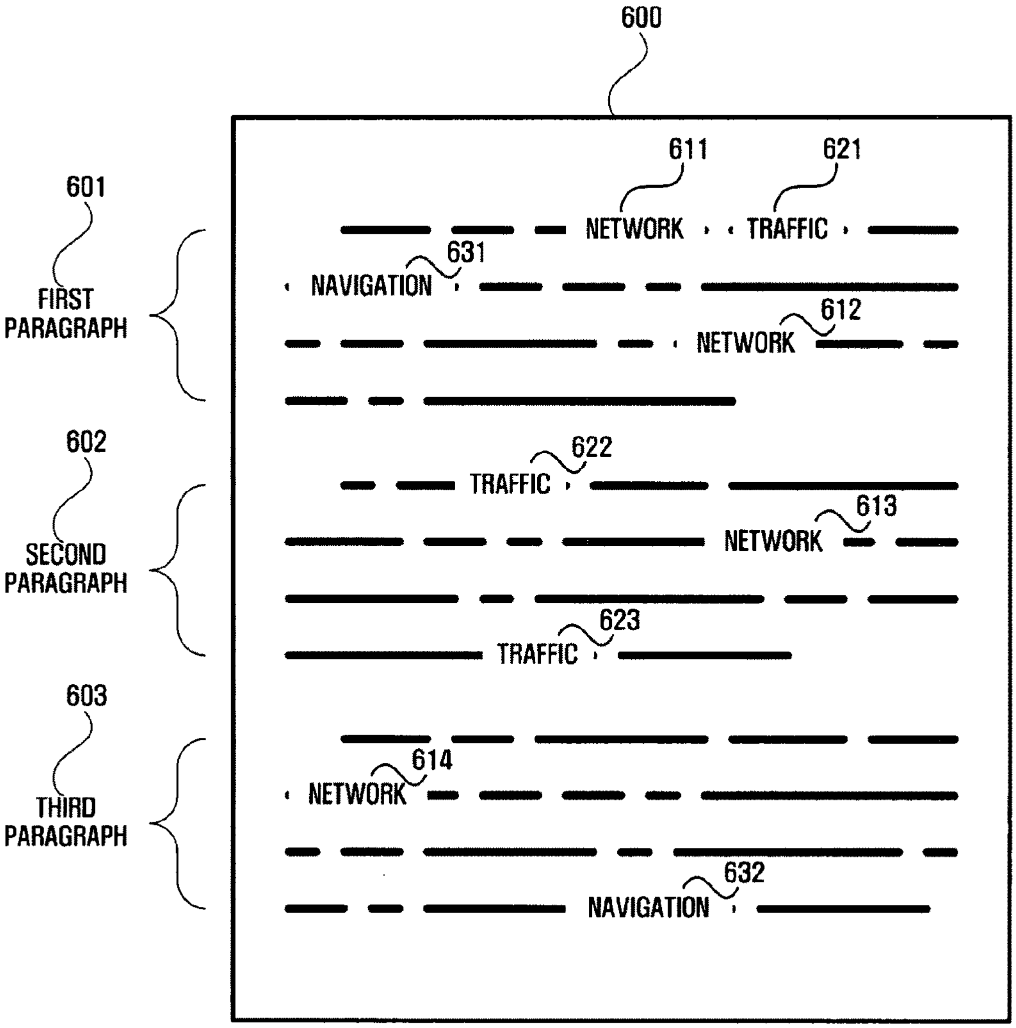
FIG. 6A illustrates how a core information item is extracted according to an embodiment of the present invention.

The core information generating unit 330 generates a core information item in which a core word is included. The generation of a core information item may be implemented by analyzing a sentence including one or more core words in the first information item, and rephrasing the sentence. Alternatively, the generation of a core information item may be implemented by determining a sentence including a core word most frequently appearing among the sentences included in the first information item, as the core information item, as shown in FIG. 6A. At this time, the core information generating unit 330 may generate one or more core information items according to the demand of the information synthesizing unit 340 in such a manner as to correspond to the voice reproducing time period.

The core information generating unit 330 may generate an information item transmitted from the information analyzing unit 320, for example the table 650 shown in FIG. 6B, where, for example, the first paragraph, in which the core words most frequently appear and the number of sentences using such core words is the largest, can be determined as the core information item.

The information synthesizing unit 340 synthesizes a core information item transmitted from the core information generating unit 330 and another information item (hereinafter, to be referred to as a "second information item"). Here, the second information item may be an advertisement or a predetermined guide information item. The "guide information item" includes the time allowed to use one or more information providing servers or one or more advertisement providing servers, the service categories capable of being used, etc.

The advertisement and the guide information item may be provided from an advertisement providing server and an information providing server, respectively, and the determination as to whether to synthesize the core information and the second information item can be made according to the user's selection. Alternatively, whether to synthesize the core information and the second information item can be determined by the information providing server. For example, if a user is required to pay fees to receive information items from an information providing server, the information synthesizing unit 340 of a voice outputting apparatus 201-204, to which the fees are charged, does not implement the synthesis of the core information item and the second information item. The information synthesizing unit 340 of another voice outputting apparatus 201-204, to which the fees are not charged, implements the synthesis of the core information item and the second information item. For this purpose, a flag as to whether the fees set by an information providing server is paid or not may be included in the core information item.

The reproducing time control unit 350 compares the voice reproducing time period set by the user and the estimated voice reproducing time period for the first information item, thereby determining whether to regenerate a core information item or not. For example, if the estimated voice reproducing time period for the first information item is larger than the voice reproducing time period set by the user, it is determined that a core information is to be regenerated, and if the estimated voice reproducing time period for the first information item is smaller than the voice reproducing time period set by the user, it is determined that a core information is not to be regenerated. The result of the determination by the reproducing time control unit 350 is transmitted to the core information generating unit 330.

In order to determine whether to regenerate a core information item, the reproducing time control unit 350 may use the following equation:

$$Ch_1 \leqq (\Delta t/t_{avg}) - Ch_2$$

Here, $Ch_1$ indicates the number of characters included in the core information item, $Ch_2$ indicates the number of characters included in the second information item, $\Delta t$ indicates a voice reproducing time period (duration), and $t_{avg}$ indicates a mean time period required for outputting voice for one character. The mean time period $t_{avg}$ can be set smaller as to output voice for more characters within a given time period, $\Delta t$. If the mean time period $t_{avg}$ is set small, the voice reproducing velocity will be increased.

That is, the reproducing time control unit 350 subtracts the number of characters included in the second information item from the number of characters capable of being outputted within a given time period, thereby calculating the number of characters included in the core information item. Then, the reproducing time control unit 350 compares the number of characters calculated in this manner and the number of characters of the core information item generated by the core information generating unit 330, and causes the core information generating unit 330 to regenerate a core information item until the calculated number of characters becomes larger than the number of the core information items generated by the core information generating unit 330. At this time, the reproducing time control unit 350 may be either a hard-real time system or a soft-real time system. If the reproducing time control unit 350 is a hard-real time system, the reproducing time control unit strictly limits the number of characters of the core information item, and if the reproducing time control unit 350 is a hard-real time system, the reproducing time control unit allows a predetermined range of error for the number of characters of the core information item.

The post-processing unit 360 processes a synthesized information item so that the synthesized information item can be processed by the voice generating unit 230, which will be described later. For example, if a service-related information item such as a flag indicating the payment of fees is included in the synthesized information item, the post-processing unit 360 removes the service-related information item and inserts one or more tags etc., to differentiate the core information item and the second information item.

Figure 4:
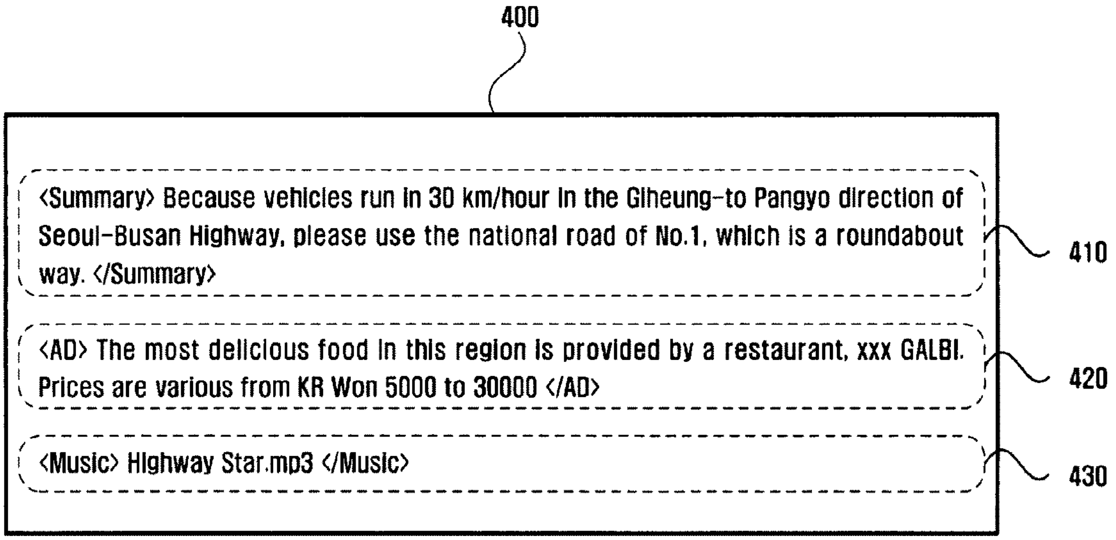
FIG. 4 illustrates information items post-processed according to an embodiment of the present invention.

The post-processed information item 400 may include a core information item 410, a second information item 420, and a piece of background music 430, which are differentiated by tags, as shown in FIG. 4. Although FIG. 4 shows that each of the core information 410, the second information item 420, and the background music 430 is formed by a single information item, each of them may include two or more information items, and the time period required for reproducing each of them may be included in the post-processed information item.

Referring to FIG. 2 again, the voice generating unit 230 serves to generate voice for an information item transmitted from the information processing unit 300. Here, the transmitted information item may include an additional information item required for generating voice as well as an information item prepared in a text format. However, the voice generating unit 230 only generates voice related to the information item in the text format.

That is, the voice generating unit 230 generates voice related to the core information item and the second information item. However, as mentioned above, the voice generation for the second information item may not be implemented according to the user's selection or the information providing server's selection.

The storage unit 280 may store music files. Here, the formats of the music files may be either compressed formats, such as MP3, OGG, and WMA, or non-compressed formats, such as WAV.

In addition, the storage unit 280 may store a URL of an information providing server or an advertisement providing server. Here, there may be two or more URLs of the information providing server or the advertisement providing server stored in the storage unit 280, where the arrangement order thereof may be determined according to the priority set by the user.

In addition, the storage unit 280 may store the information categories inputted through the input unit 240. As a result, the information search unit 220, the information processing unit 300, and the background music selecting unit 250 can implement their functions, respectively, with reference to the information categories previously stored in the storage unit 280, as well as the information categories inputted at real time through the input unit 240.

The storage unit 280 is a module allowing reading/writing of information, such as a hard disc, a flash memory, a CF (Compact Flash) card, an SD (Secure Digital) card, an SM (Smart Media) card, an MMC (Multimedia Card), or a memory stick, where the module may be provided within a voice outputting apparatus 201-204 or in a separate apparatus.

The background music selecting unit 250 serves to select at least one piece of background music, which is desired to be reproduced while the voice generated by the voice generating unit 230 is being outputted, among the music files stored in the storage unit 280.

When selecting the background music, the background music selecting unit 250 may select the background music in such a manner as to correspond to an information category inputted through the input unit 240. For example, if the information category is news, normal tempo music may be selected. If the information category is sports or entertainment, upbeat music may be selected. In addition, the background music selecting unit 250 may select the background music with reference to an additional information item, such as the genre, musician, title, lyrics, and issue year of the music file, beyond the tempo, where the additional information item may be an information item included in the music file, for example, ID3.

The background music reproducing unit 260 serves to reproduce the background music selected by the background music selecting unit 250. That is, when the music file selected by the background music selecting unit 250 is a compressed music file, the background music reproducing unit 260 releases the compression, decodes the music file in a file format capable of being reproduced, and then reproduces the music in the file.

The audio synthesizing unit 270 serves to synthesize a piece of background music and voice generated by the voice generating unit 230.

When synthesizing voice and background music, the audio synthesizing unit 270 is capable of tuning the volume of the reproduced background music, depending on the voice. For example, the audio synthesizing unit 270 reduces the volume of the background music while the voice provided from the information provision server is being outputted, and increases the volume of the background music at an interval between an information item and another information item, when voice is not outputted.

The output unit 290 serves to output audio signals synthesized by the audio synthesizing unit 270. That is, the output unit 290 converts an electric signal containing voice information into vibration, thereby generating dilatational waves in a surrounding atmosphere so as to copy a sonic wave. In general, a speaker serves as the output unit 290.

The output unit 290 may convert an electric signal into a sonic wave through dynamic conversion, electromagnetic conversion, electrostatic conversion, dielectric conversion, magnetostrictive conversion, etc.

Figure 5:
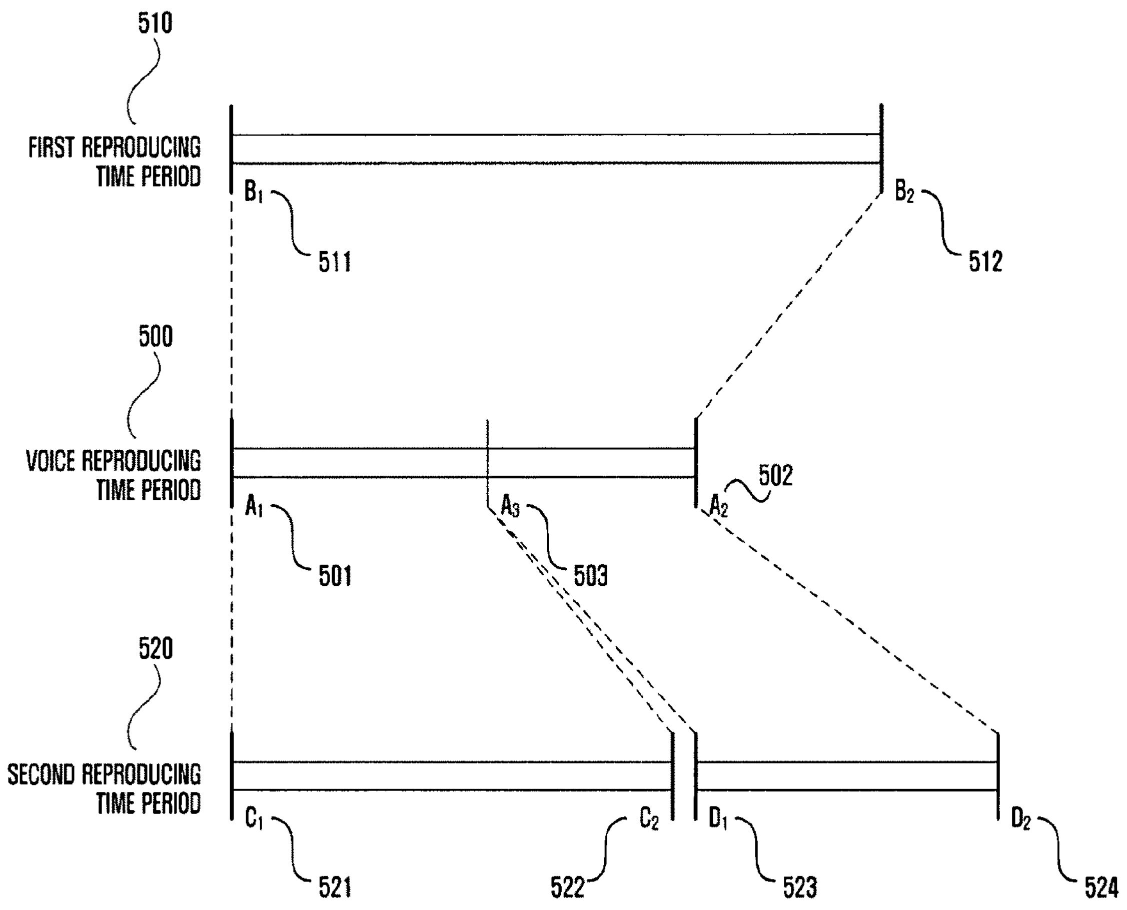
FIG. 5 illustrates how a voice outputting time period is set so as to correspond to a preset voice reproducing time period according to an embodiment of the present invention.

FIG. 5 illustrates how a voice outputting time period is set to correspond to a voice reproducing time period preset according to an embodiment of the present invention.

A user who plans to move may estimate an approximate moving time at a position on a route the user wishes to move. As a result, the user is capable of inputting a voice reproducing time period 500 through the input unit 240, where the voice reproducing time may be a duration, such as twenty (20) minutes, or a specific time interval, such as 1:20 p.m. to 2:10 p.m. Hereinafter, it is assumed that a specific time interval is inputted.

In FIG. 5, a time point $A_1$ 501 and a time point $A_2$ 502 correspond to a starting time and a terminating time of the voice reproducing time period 500, respectively. In addition, a first reproducing time period 510 is an estimated voice outputting time period for a synthesized information item, which is formed by synthesizing a first information item and a second information item. If the first reproducing time period 510 from a time point $B_1$ 511 to a time point $B_2$ 512 is larger than the voice reproducing time period 500 as shown in FIG. 5, the core information generating unit 330 extracts a core information item from the first information item included in the synthesized information item so that the estimated voice outputting time period 510 for the synthesized information corresponds to the voice reproducing time period 500.

In addition, a second reproducing time period 520 is an estimated voice outputting time period for two synthesized information items. From FIG. 5, it can be seen that the estimated voice outputting time period of each synthesized information item is smaller than the voice reproducing time period 500 but the total estimated voice outputting time period of two synthesized information items is larger than the voice information time period 500. Therefore, the core information unit 330 extracts a core information item from the first information item included in each synthesized information item, where each time period assigned within the voice reproducing time period 500 is determined according to the size of each synthesized information item or the user's preference for the synthesized information items. That is, since the size of a synthesized information item (to be referred to as "a first synthesized information item) estimated to be outputted during a time period from a time point C, 521 to a time point $C_2$ 522 is larger than that of a synthesized information item (to be referred to as "a second synthesized information item) estimated to be outputted during a time period from a time point $D_1$ 523 to a time point $D_2$ 524, a time point $A_3$ 503 is determined in such a manner that the time period assigned to reproduce the first synthesized information item within the voice reproducing time period is larger than the time period assigned to reproduce the second synthesized information item.

Here, the user's preference can be determined according to priority ranking, appearance frequency of key words, etc.

FIG. 6A shows how a core information item is extracted according to an embodiment of the present invention, where a core information item is extracted from a first information item 600 searched by the information search unit 220.

Here, the first information item 600 consists of three paragraphs 601, 602 and 603, where each paragraph contains core words. The core words may be determined by appearance frequency in an entire sentence or may be determined depending on whether they are similar to key words inputted by the user.

As shown in FIG. 6A, in the first information item 600, the core word "network" 611, 612, 613 and 614 appears four times, the core word "traffic" 621, 622 and 623 appears three times, and the core word "navigation" 631 and 632 appears twice.

As a result, the priority ranking is determined in the order of "network," "traffic," and "navigation." According to the priority ranking determined in this manner, the core information generating unit 330 determines the priorities for the paragraphs. The core information generating unit 330 assigns the first priority to the first paragraph 601 which includes the most number of core words, the second priority to the second paragraph 602 which includes the core words, "network" and "traffic," "traffic" appearing two times and "network" appearing once, and the third priority to the third paragraph which includes the core words, "navigation" and "network," each of which appears one time.

Therefore, if the estimated voice outputting time period for the first information item 600 is larger than the voice reproducing time period, the core information generating unit 330 first transmits a core information item, which only includes the first paragraph 601 and the second paragraph 602, exclusive of the third paragraph 603, to the reproducing time control unit 350. The core information generating unit 330 may subsequently perform additional exclusion of the second paragraph 602 according to a control command from the reproducing time control unit 350.

FIG. 6A shows how a voice reproducing time period and an estimated synthesized information outputting time period can be synchronized by selecting one or more paragraphs to be outputted by voice according to the appearance frequency of core words. The synchronization of the voice reproducing time period and the estimated synthesized information outputting time period can be accomplished by adjusting the velocity of voice reproduction implemented by the voice generating unit 230.

In order to generate a core information item as described above, it is possible to use table 650 as shown in FIG. 6B. Table 650 includes field 651 indicating core words, field 652 indicating the appearance frequency of core words, and field 653 indicating the number of paragraphs using core words. The core information generating unit 330 may assign priority ranking to each of the paragraphs with reference to either field 651 indicating core words or field 653 indicating the number of paragraphs using core words 653 in table 650. That is, the core information generating unit 330 may assign the first priority to the first paragraph 601, which includes core words, "network," "traffic," and "navigation." In addition, the core information generating unit 330 may assign the second priority to the second paragraph 602, which includes core words, "network" and "traffic," as well as to the third paragraph 603, which includes core words, "network" and "navigation."

Figure 7A:
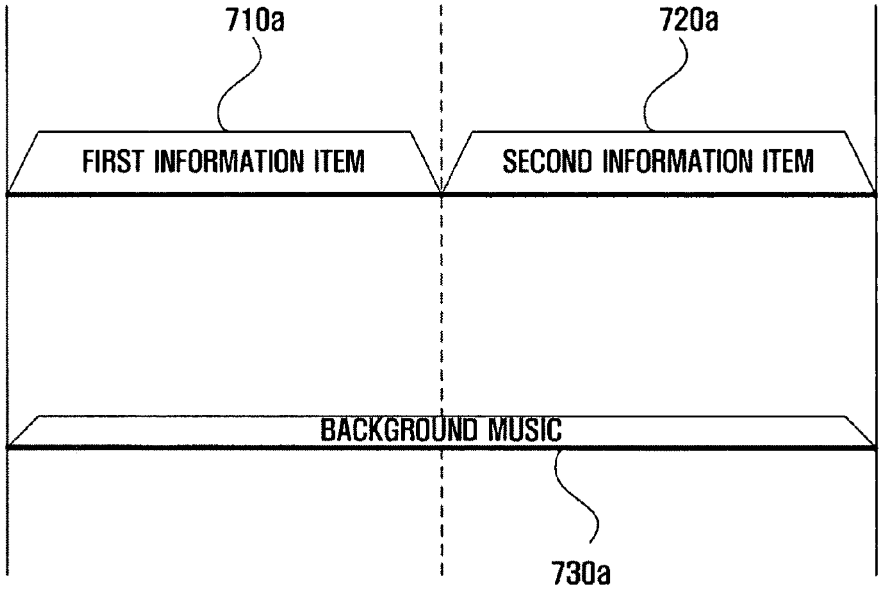
FIG. 7A illustrates outputted formats of voice and background music according to an embodiment of the present invention by way of a first example.
Figure 7B:
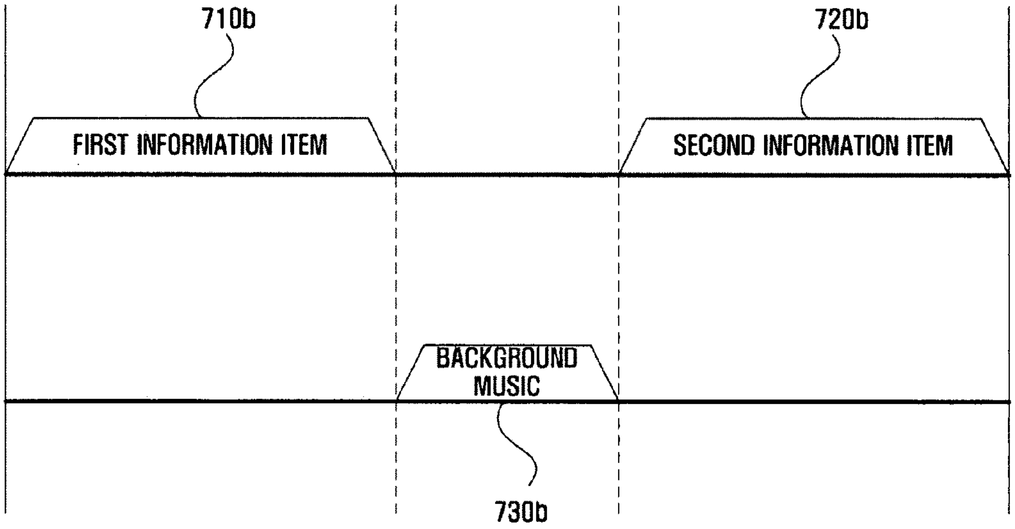
FIG. 7B illustrates outputted formats of voice and background music according to an embodiment of the present invention by way of a second example.
Figure 7C:
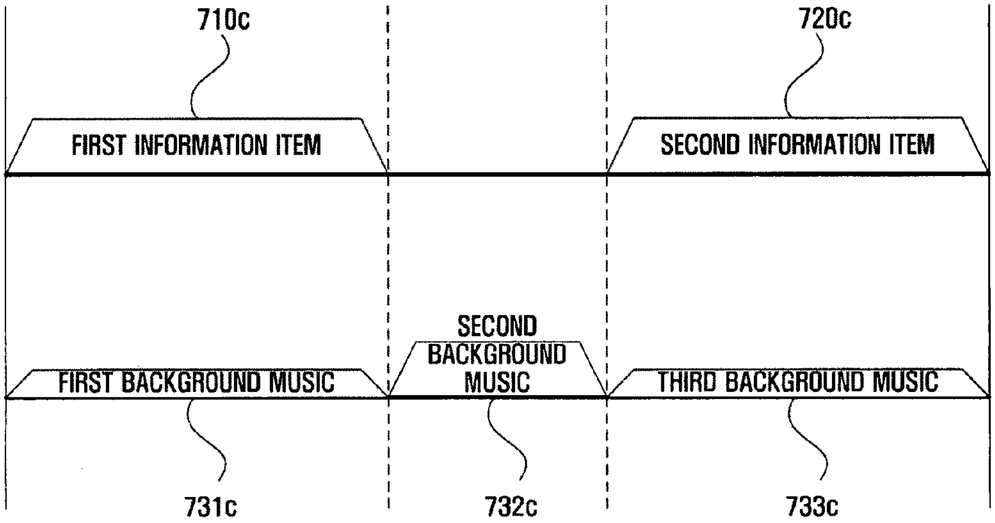
FIG. 7C illustrates outputted formats of voice and background music according to an embodiment of the present invention by way of a third example.

FIGS. 7A to 7C exemplify the output types of background music according to an embodiment of the present invention. FIG. 7A shows that the background music 730*a* is outputted while the voices 710*a* and 720*a* for the first and second information items are being outputted. In FIG. 7A, the voices 710*a* and 720*a* for the first and second information items may be outputted in a normal level of volume and the background music 730*a* may be outputted in a relatively lower level of volume.

FIG. 7B shows that the voice 710*b* for the first information item is first outputted, thereafter the background music 730*b* is outputted for a predetermined time period, and the voice 720*b* for the second information is outputted after the output of the background music 730*b* is completed. In FIG. 7B, all of the voice 710*b* for the first information item, the voice 720*b* for the second information item, and the background music 730*b* may be outputted in a normal level of volume.

FIG. 7C shows that a first piece of background music 731*c* is outputted while voice 710*c* for the first information item is being outputted, thereafter a second piece of background music 732*c* is outputted, and a third piece of background music 733*c* is outputted simultaneously with the voice 720*c* for the second information item after the output of the second piece of background music 732*c* is completed. Here, the voice 710*c* for the first information item, the voice 720*c* for the second information item, and the second piece of background music 732*c* may be outputted in a normal level of volume, and the first piece of background music 731*c* and the third piece of background music 733*c* may be outputted in a relatively lower level of volume.

Figure 8:
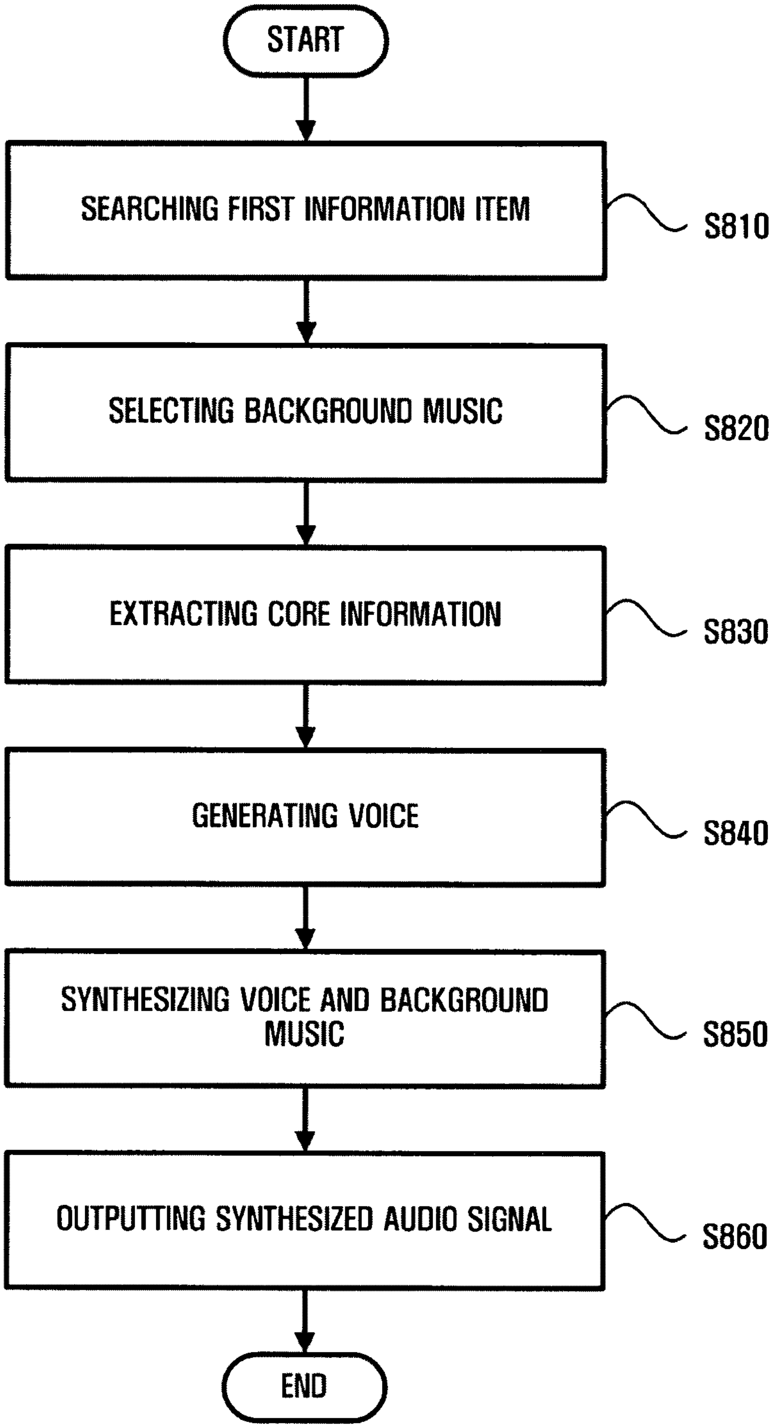
FIG. 8 is a flowchart illustrating a process of outputting voice according to an embodiment of the preset invention.

FIG. 8 shows a process of outputting voice according to an embodiment of the present invention.

In order to output voice, the information search unit 220 of the voice outputting apparatus 201-204 first searches a first information item existing on a network with reference to an information class inputted by the user (S810).

A searched information item is transmitted to the background music selecting unit 250. As a result, the background music selecting unit 250 selects a background music in such a manner that the background music corresponds to the information class (S820), and the information processing unit 300 extracts a core information item from the first information item in such a manner as to correspond with the voice reproducing time period (S830). When extracting the core information item, the information processing unit 300 may synthesize the first and second information items, and then extract a core information item in such a manner that the estimated voice outputting time period corresponds to the voice reproducing time period.

The extracted core information item and the second information item are transmitted to the voice generating unit 230, and the voice generating unit 230 generates voice for the transmitted information items (S840).

Then, the audio generating unit 230 synthesizes the voice transmitted from the voice generating unit 230 and the background music transmitted from the background music generating unit 260 (S850). The synthesized audio signal is outputted through the output unit 290 (S860).

Figure 9:
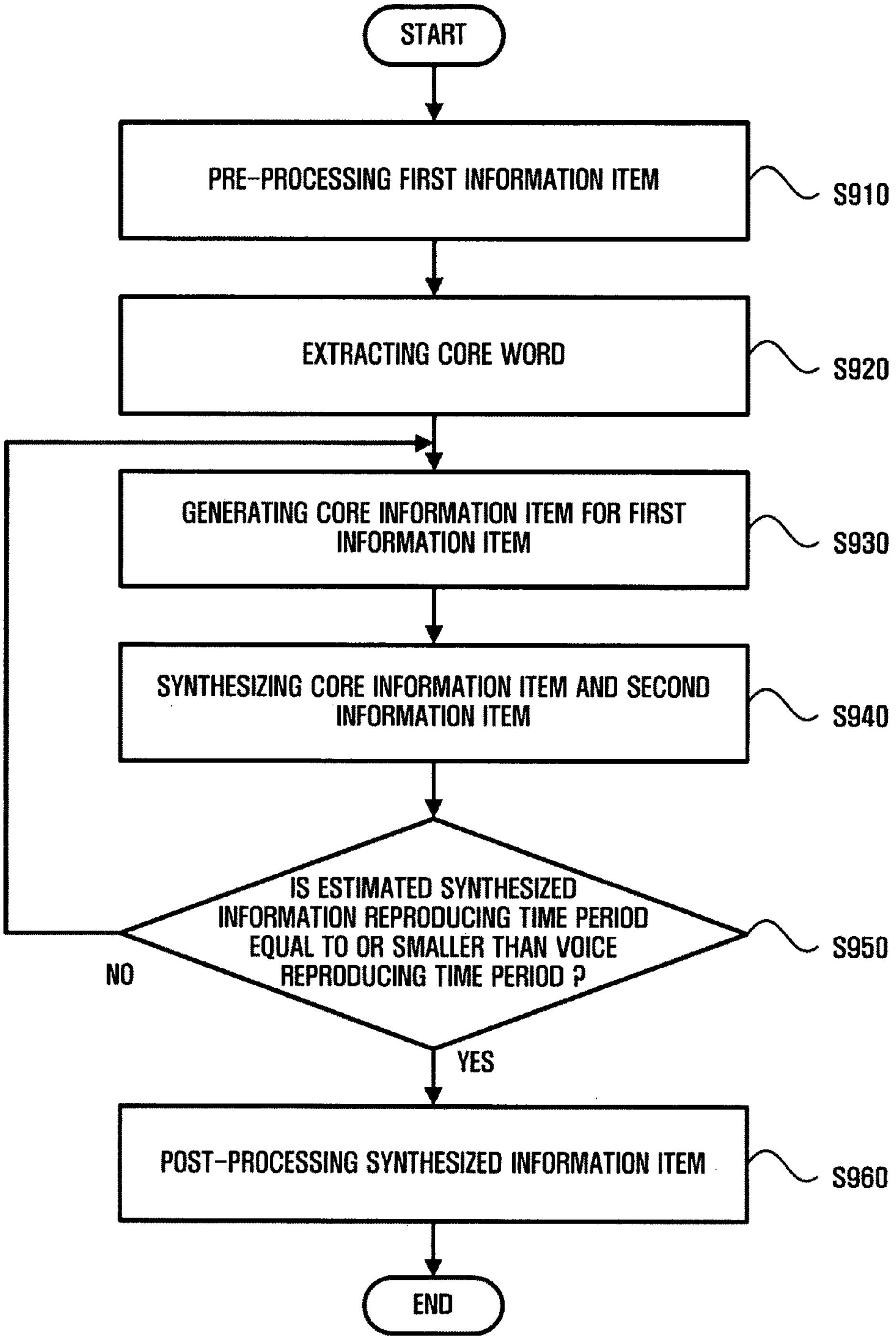
FIG. 9 is a flowchart illustrating an information processing process according to an embodiment of the present invention.

FIG. 9 is a flowchart showing a process of processing information items according to an embodiment of the present invention.

The pre-processing unit 310 of the information processing unit 300 pre-processes the first information item (S910). That is, the pre-processing unit 310 extracts a text information item from the first information item, thus removing a tag information item, an additional information item, etc. included in the first information item.

The pre-processed first information item is transmitted to the information analyzing unit 320, which in turn extracts a core word from the first information item (S920).

Then, the core information generating unit 330 generates a core information item including the core word (S930), and the information synthesizing unit 340 synthesizes the core information item and the second information item (S940).

The synthesized information item is transmitted to the reproducing time control unit 350, where the reproducing time control unit 350 compares the estimated voice reproducing time period for the synthesized information and the voice reproducing time period (S950). If the estimated synthesized information reproducing time period is larger than the voice reproducing time period, the reproducing time control unit is capable of rendering the core information generating unit 330 and the information synthesizing unit 340 to execute re-generation of a core information item (S930) and re-synthesizing of information items.

Meanwhile, if the estimated synthesized information reproducing time period is equal to or smaller than the voice reproducing time period, the post-processing unit 360 processes the synthesized information item so that the synthesized information item can be treated by the voice generating unit 230 (S960).

According to the inventive voice outputting apparatus and method, one or more of following effects can be obtained: i) by receiving an information item suitable to a user among information items existing on a network in a text format, it is possible to prevent waste of bandwidth of the network; ii) by converting a received text into voice and outputting the voice, the inventive voice outputting apparatus is easy and convenient for a user to carry; and iii) by converting voice considering the length of time required for reproducing voice so that a corresponding information item can be outputted for a predetermined length of time, information items can be easily and conveniently provided for the user.

Although embodiments of the present invention have been described for illustrative purposes, those skilled in the art will appreciate that various modifications, additions and substitutions are possible, without departing from the scope and spirit of the invention as disclosed in the accompanying claims. Therefore, the embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. An apparatus to output voice, comprising:
- an information search unit to search at least one first information item corresponding to a preset information class among information items existing on a network;
- an information processing unit to extract a core information item from the first information item such that an estimated voice reproducing time period for the first information item corresponds to a preset reproducing time period, wherein the information processing unit comprises:
  - an information analyzing unit to extract at least one core word included in the first information item;
  - a core information generating unit to generate the core information item in which the core word is included; and
  - a reproducing time control unit to compare the estimated voice reproducing time period for the first information item and the preset reproducing time period, to determine whether to regenerate the core information item;
- a voice generating unit to convert the core information into voice; and
- an output unit to output the converted voice.

2. The apparatus according to claim 1, wherein the preset reproducing time period comprises a time interval between a starting time and a terminating time when the starting time and the terminating time are inputted.

3. The apparatus according to claim 1, wherein the preset reproducing time period comprises an estimated time period required for moving from a starting place to a destination when positional information items of the starting place and the destination are inputted.

4. The apparatus according to claim 1, wherein the at least one core word comprises a plurality of core words, and the core information generating unit assigns priority to portions of the first information item based on an appearance frequency of the core words to generate the core information item or a number of the portions that use the code words to generate the core information item.

5. An apparatus to output voice, comprising:
- an information search unit to search at least one first information item corresponding to a preset information class among information items existing on a network;
- an information processing unit to extract a core information item from the first information item such that an estimated voice reproducing time period for the first information item corresponds to a preset reproducing time period;
- a reproducing time control unit to compare the preset reproducing time period and an estimated voice reproducing time period for a synthesized information item which is composed of the core information item and a second information item, to determine whether to regenerate the synthesized information item;
- a voice generating unit to convert the core information into voice; and
- an output unit to output the converted voice.

6. The apparatus according to claim 5, wherein the preset reproducing time period comprises a time interval between a starting time and a terminating time when the starting time and the terminating time are inputted.

7. The apparatus according to claim 5, wherein the preset reproducing time period comprises an estimated time period required for moving from a starting place to a destination when positional information items of the starting place and the destination are inputted.

8. The apparatus according to claim 5, wherein the synthesized information item is regenerated if the estimated reproducing time period for the synthesized information item is larger than the preset reproducing time period.

9. The apparatus according to claim 8, wherein the synthesized information item is not regenerated if the estimated reproducing time period for the synthesized information item is equal to or smaller than the preset reproducing time period and is processed in order to be treated by the voice generating unit.

10. The apparatus according to claim 5, wherein the second information item comprises one or more information items existing on the network.

11. The apparatus according to claim 5, wherein the format of the synthesized information item comprises text.

12. The apparatus according to claim 5, further comprising a background music selecting unit to select background music while the synthesized information item is outputted in voice.

13. The apparatus according to claim 12, wherein the background music selecting unit selects the background music to correspond to a category of the synthesized information item.

14. The apparatus according to claim 5, wherein the voice generating unit generates voice corresponding to the synthesized information item.

15. A method of outputting voice, comprising:
- searching at least one first information item corresponding to a preset information category among information items existing on a network;
- extracting a core information item from the first information item such that an estimated voice reproducing time period for the first information item corresponds to a preset reproducing time period, wherein the extracting the core information item comprises:
  - extracting at least one core word included in the first information item;
  - generating the core information item in which the core word is included; and
  - comparing the estimated voice reproducing time period for the first information item and the preset reproducing time period, and determining whether to regenerate the core information;
- converting the core information item into voice; and
- outputting the converted voice using a speaker.

16. The method according to claim 15, wherein the preset reproducing time period comprises a time interval between a starting time and a terminating time when the starting time and the terminating time are inputted.

17. The method according to claim 15, wherein the preset reproducing time period comprises an estimated time period required for moving from a starting place to a destination when positional information items of the starting place and the destination are inputted.

18. The method according to claim 15, wherein the at least one core word comprises a plurality of core words, and priority is assigned to portions of the first information item based on an appearance frequency of the core words to generate the core information item.

19. A method of outputting voice, comprising:

searching at least one first information item corresponding to a preset information category among information items existing on a network;

extracting a core information item from the first information item such that an estimated voice reproducing time period for the first information item corresponds to a preset reproducing time period, wherein the extracting a core information item further comprises:

comparing the preset reproducing time period and an estimated voice reproducing time period for a synthesized information item, which is composed of the core information item and a second information item, and determining whether to regenerate the synthesized information item;

converting the core information item into voice; and outputting the converted voice using a speaker.

20. The method according to claim 19, wherein the synthesized information item is regenerated if the estimated reproducing time period for the synthesized information item is larger than the preset reproducing time period.

21. The method according to claim 20, wherein the synthesized information item is not regenerated if the estimated reproducing time period for the synthesized information item is equal to or smaller than the preset reproducing time period.

22. The method according to claim 19, wherein the second information item comprises one or more information items existing on the network; and the format of the synthesized information item comprises text.

23. The method according to claim 19, further comprising selecting background music while the synthesized information item is outputted in voice.

24. The method according to claim 23, wherein the selecting the background music selects the background music to correspond to a category of the synthesized information item.

25. The method according to claim 19, wherein the converting the core information item comprises generating voice corresponding to the synthesized information item.

26. The method according to claim 19, wherein the preset reproducing time period comprises a time interval between a starting time and a terminating time when the starting time and the terminating time are inputted.

27. The method according to claim 19, wherein the preset reproducing time period comprises an estimated time period required for moving from a starting place to a destination when positional information items of the starting place and the destination are inputted.

28. An apparatus to output voice, comprising:

an information search unit to search a first information item corresponding to a preset information class among information items existing on a network;

an information processing unit to extract a core information item from the first information item such that an estimated voice reproducing time period for the first information item corresponds to a preset reproducing time period, wherein the information processing unit comprises:

a reproducing time control unit to compare the estimated voice reproducing time period for the first information item and the preset reproducing time period, to determine whether to regenerate the core information item;

a voice generating unit to convert the core information into voice; and an output unit to output the converted voice.

29. A method of outputting voice, comprising:

searching a first information item corresponding to a preset information category among information items existing on a network;

extracting a core information item from the first information item such that an estimated voice reproducing time period for the first information item corresponds to a preset reproducing time period, wherein the extracting a core information item comprises:

comparing the estimated voice reproducing time period for the first information item and the preset reproducing time period, and determining whether to regenerate the core information;

converting the core information item into voice; and outputting the converted voice using a speaker.

* * * * *

UNITED STATES PATENT AND TRADEMARK OFFICE

CERTIFICATE OF CORRECTION

PATENT NO. : 8,050,927 B2
APPLICATION NO. : 11/980525
DATED : November 1, 2011
INVENTOR(S) : Yoo et al.

It is certified that error appears in the above-identified patent and that said Letters Patent is hereby corrected as shown below:

Column 13, Line 48, In Claim 4, delete "code words" and insert -- core words --, therefor.

Signed and Sealed this
Twenty-ninth Day of May, 2012

David J. Kappos

David J. Kappos
*Director of the United States Patent and Trademark Office*